Patented Oct. 26, 1954

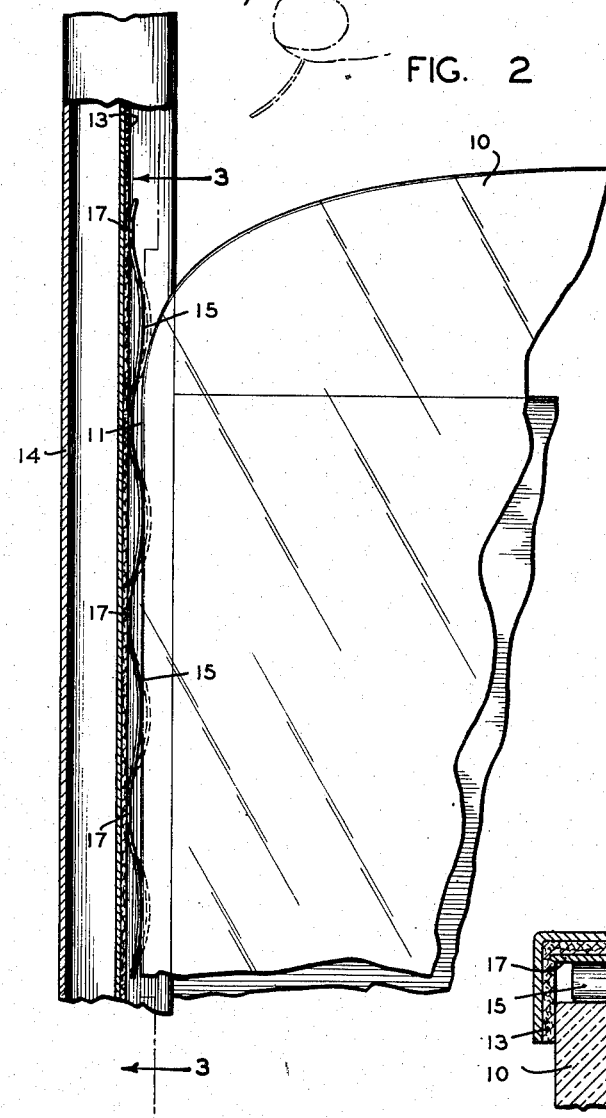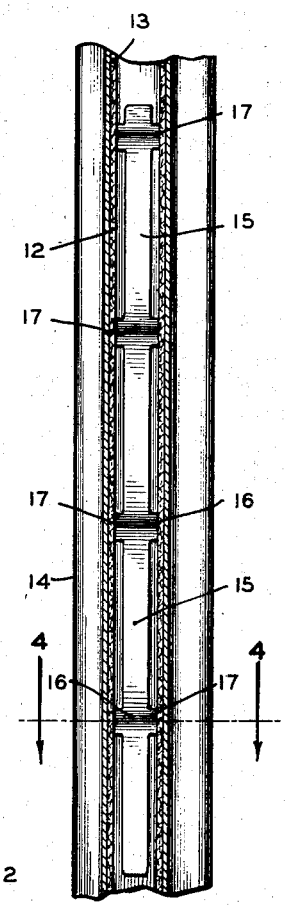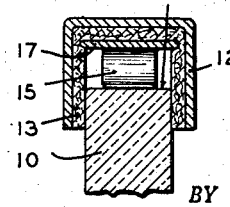

2,692,794

UNITED STATES PATENT OFFICE 2,692,794

ANTIRATTLE DEVICE FOR WINDOWS

Charles D. West, Orlando, Fla.

Application December 26, 1951, Serial No. 263,179

1 Claim. (Cl. 296—44.5)

This invention relates to windows, particularly vehicle windows having transparent glass panels, movable to permit the windows to be opened or closed as desired, and the mounting of the glass panels in their supporting structures.

Specifically, the invention is directed to an anti-rattle structure for preventing the movable glass panel in a door or window of a vehicle such as an automobile from vibrating and causing undesirable noise, as well as the protection of the glass against breakage.

Doors and windows of various types of vehicles particularly automobiles, frequently vibrate and rattle due to the fact that the channels must be of a sufficient size to accommodate shock absorbing material such as felt and permit the glass to slide freely, the compacting of the felt in the channels enlarging the slideway allowing the glass to vibrate and rattle.

Numerous attempts have been made to prevent rattling of the glass panel in its mounting, including the use of spring cushioning members and other means, some of which have been satisfactory to a degree and others have failed. Also, some have been too expensive and complicated, as well as making it necessary to incorporate the same when the windows were first constructed, and not capable of being applied to windows already in existence.

Therefore, it is an object of the invention to provide a relatively simple, inexpensive, easily applicable, anti-rattle device for the movable glass panel of a window, door, or other supporting frame which anti-rattling device can be easily applied to a window already in existence.

A further object of the invention is to provide an anti-rattle device which may serve not only to assist in supporting a glass panel in a frame, but which will readily anchor itself in position in the slideway in which the glass panel is mounted but which may be easily removed as well as applied.

Further objects and advantages of the invention will be apparent from the following description taken in conjunction with the accompanying drawings, wherein:

Fig. 1 is a perspective illustrating one application of the invention;

Fig. 2, a fragmentary detail of a glass window panel and the frame in which it is mounted, with parts broken away to disclose the invention as applied; and a phantom showing of the strip being applied;

Fig. 3, a view on the line 3—3 of Fig. 2; and

Fig. 4, a detail section on the line 4—4 of Fig. 3.

Briefly stated, the invention is a strip of spring metal or other material having alternate portions oppositely bowed from end to end, and with the portions bowed in one direction having portions of increased width or projections serving as mounting elements. This spring strip is adapted to be inserted endwise downwardly between the edge of a glass window panel and the channel in which it operates, with the portion with the projections against the bottom of the panel so that these projections serve as fastening elements to anchor the strip in position and with the portion without the projections yieldably engaging the edge of the glass.

With continued reference to the drawing, a glass window panel 10, having a relatively straight edge 11, is slidable in a U-shaped channel member 12, provided with a felt lining 13. The channel member 12 is conventional and is part of a window or door frame 14.

The felt lining 13 being relatively soft serves as a cushioning mounting for the glass panel, so that the panel will not come in contact with the metal channel and be broken. The felt becomes more compact with age and also wear occurs as the glass is used and consequently the edges of the glass and the felt in the U-shape channel do not form a tight joint and vibration and rattling result.

In order to compensate for this wear and to support the glass adequately, so that it will not move and vibrate, a spring strip is employed having alternately oppositely bowed portions 15 and 16 providing hills and valleys respectively, and with the portions 16 bowed in the same direction having portions of increased width or projections or tabs serving as mounting extensions 17 at each side of the strip. The main body of this strip is sufficiently narrow to slide readily between the sides of the felted channel member, but the wider or anchoring portion 17 will engage the opposite sides of the felt lining to maintain the strip in position. The bowed portion 16 engage the bottom of the felt in the channel at spaced locations, while the bowed portions 15 similarly engage the edge of the glass at spaced locations.

It will be readily apparent that there is provided a spring strip or cushioning element for compensating for the space or lost motion between a glass panel and its mounting that yields sufficiently not to injure the glass, and will anchor itself firmly when applied so that it will not be readily displaced and become ineffective. Further, the strip may be produced in short or continuous lengths, as desired, and if continuous may be detached to provide a section of the necessary length for a particular window. Also the strips may be easily inserted or removed, but will effectively perform the function for which it is designed, and the simplicity of the same, its protection, and small cost, make it particularly attractive.

It will be obvious to those skilled in the art that various changes may be made in the invention without departing from the spirit and scope thereof, and therefore, the invention is not limited by that which is shown in the drawings and described in the specification but only as indicated in the appended claim.

What is claimed is:

For use in a channel member having a bottom web and a pair of outwardly extending flanges arranged in substantially parallel spaced relation with cushioning material on the inner surfaces of the outwardly extending flanges substantially reducing the effective width of the channel for snugly receiving the edge of a sliding glass panel, a strip of substantially flat resilient material of less width than the spacing between said flanges for mounting in said channel member between said cushioning material, said strip having a plurality of hills and valleys for extension away from and toward the bottom web of the channel, said strip having integral oppositely extending tabs projecting laterally at the bottom of the valleys only, said tabs being of relatively small dimension along the longitudinal dimension of the strip relative to the spacing between adjacent hills, the total width of the strip and the width of the oppositely extending tabs at each valley being appreciably greater than the distance between the adjacent surfaces of the cushioning material on the inner surfaces of the outwardly extending flanges whereby the projections may extend into such cushioning material and retain the strip in position and the hills may engage the edge of the sliding panel.

References Cited in the file of this patent

UNITED STATES PATENTS

| Number | Name | Date |
| --- | --- | --- |
| 1,435,039 | Woodward | Nov. 7, 1922 |
| 2,263,121 | Crill | Nov. 18, 1941 |
| 2,485,876 | Guest | Oct. 25, 1949 |
| 2,504,510 | Ernest | Apr. 18, 1950 |
| 2,539,064 | Ernest | Jan. 23, 1951 |